Dec. 6, 1955

B. DAUM 2,725,914

SPECTACLE CASE

Filed June 11, 1953

INVENTOR.
Bernard Daum
BY Harold E. Cole
Attorney

Dec. 6, 1955
B. DAUM
2,725,914
SPECTACLE CASE
Filed June 11, 1953
2 Sheets-Sheet 2
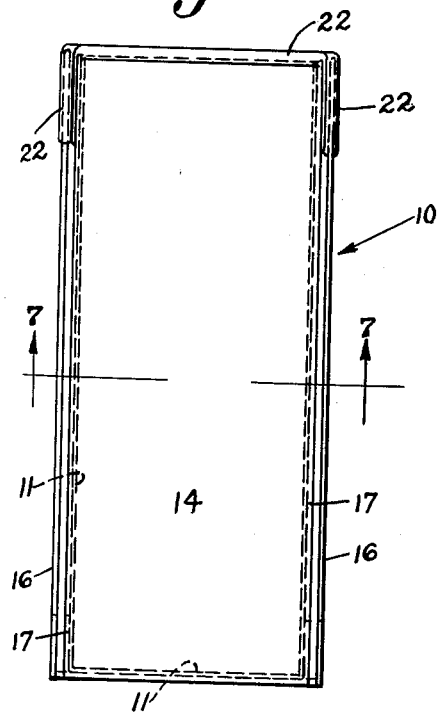
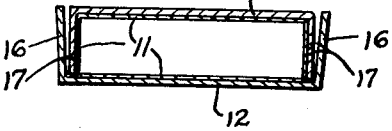
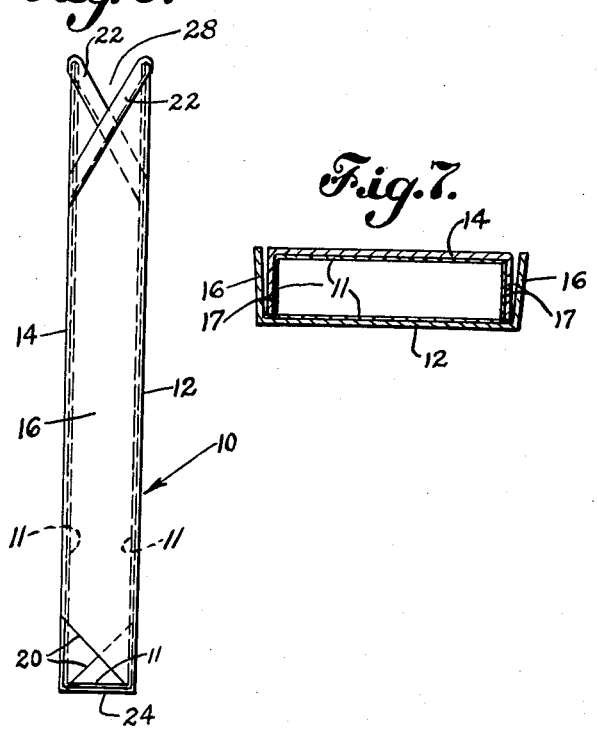
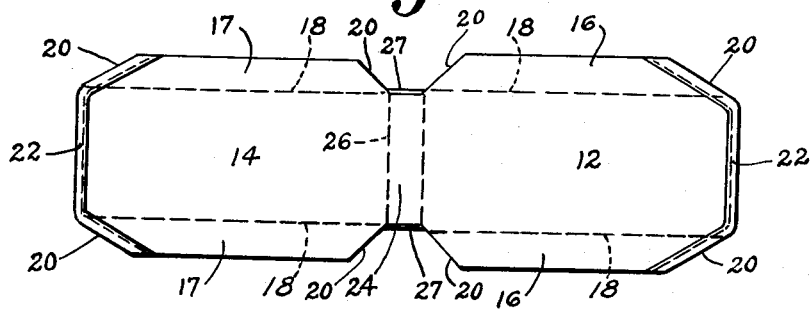
INVENTOR.
Bernard Daum
BY Harold E. Cole
Attorney

United States Patent Office 2,725,914
Patented Dec. 6, 1955

2,725,914

SPECTACLE CASE

Bernard Daum, Newton, Mass., assignor to Windsor Case Co., Inc., Boston, Mass, a corporation Application June 11, 1953, Serial No. 360,931

3 Claims. (Cl. 150—52)

This invention relates to a spectacle case having an inner receptacle and an outer casing.

One object of my invention is to provide a spectacle case that is so stiff or firm that it will withstand considerable pressure, yet is so constructed that it can be manufactured at a relatively low cost.

Another object is to provide such a case that has the quality and appearance of a more expensive case.

A further object is to provide such a case with an inner, protective receptacle that is relatively inexpensive and can readily be combined with an attractive outer casing without the use of attaching means.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Figure 5 is a front elevational view of the inner receptacle used in my case.

Figure 6 is a side elevational view of said inner receptacle.

Figure 7 is a sectional view taken on the line 7—7 of Figure 5.

Figure 8 is a top plan view of the blank forming said inner receptacle.

Figure 1:
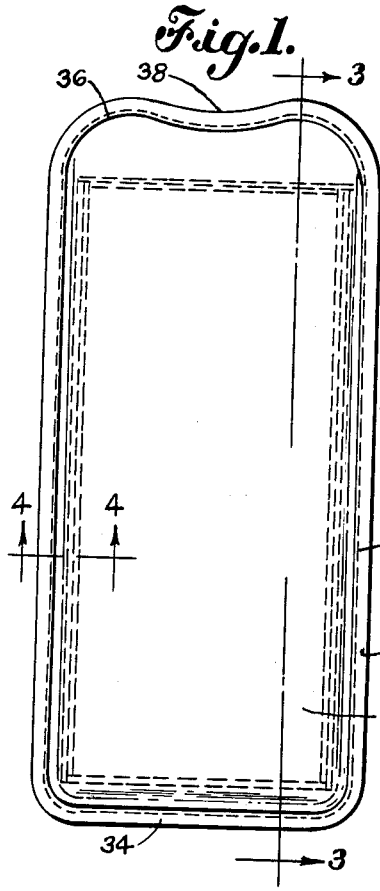
Figure 1 is a front elevational view of my complete spectacle case.
Figure 2:
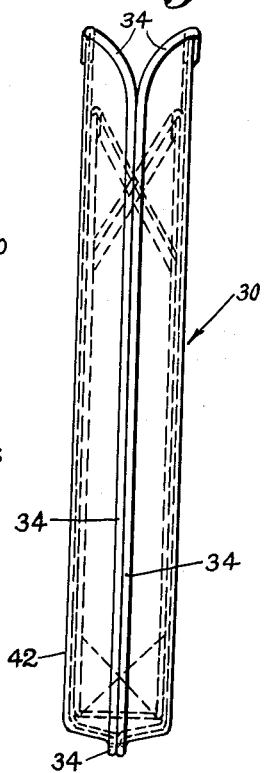
Figure 2 is a side elevational view thereof.
Figure 3:
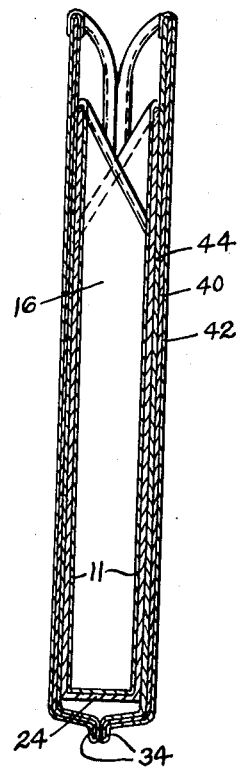
Figure 3 is a sectional view taken on the line 3—3 of Figure 1.
Figure 4:
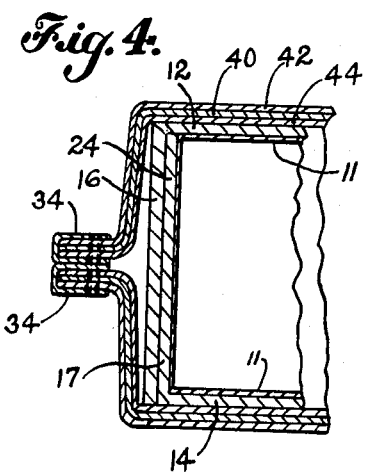
Figure 4 is a greatly enlarged sectional view taken on the line 4—4 of Figure 1.

As illustrated, my spectacle case has an inner, protective receptacle 10 which may be made of a single, flat blank of fiberboard or other stiff material, as shown in said Figure 8, covered by cloth 11 at one face surface. Said receptacle 10 has side portions 12 and 14, each of which includes two flanges 16 and 17 respectively at opposite sides of the main body which are formed by scoring said blank as at 18. Both ends of said flanges 16 and 17 extend diagonally as at 20, being notched out at the outer corners. At the outer ends of said side portions 12 and the diagonally extending outer ends of said flanges there is a decorative binding 22 of French cord or other soft and attractive material at the edges. A connecting portion 24 at the inner ends of the main bodies of said receptacle side portions 12 and 14 connect the latter, and space them apart in assembled position, being divided from each said side portion by score lines 26. The outer edges 27 of said connecting portion 24 extend diagonally outward from said side portion 14 to said side portion 12 slightly, hence the main body of side portion 12 is slightly wider than that of side portion 14.

Said flanges 16 are slightly wider than said flanges 17 because in assembling the portions of this blank to form a receptacle the flanges 17 are at the inside and the flanges 16 on the outside. This construction permits the longitudinal edges of the flanges 16 to extend flush with the exterior surface of the main body of said side portion 14, thus providing a receptacle with smooth exterior surfaces. It is open, as at 28, at one end to receive spectacles or other articles.

When the aforesaid portions are bent along the said score lines 18 and 26, said inner receptacle 10 is loosely assembled, that is, the different portions form a rectangularly-shaped receptacle with an open mouth; but the portions are not fastened together. In this loosely assembled condition it is ready to be inserted in an outer casing 30.

A pair of laminated, flat side pieces 42 having decorative binding 34 of French cord, or other soft and attractive material, all around their outer borders, are stitched together as at 36 to form said outer casing with an open mouth. Each side piece is slightly recessed at the top as at 38, the body of which is formed of a relatively heavy paper 40 made of several laminations, and which is flexible and preferably thinner than said fiberboard forming said inner receptacle 10. On one face of each side piece is a cloth cover 42 of attractive material and on the other is a plainer cloth material cover 44, thus completely covering both face surfaces of said piece of paper 40.

Said casing 30 is of a size that permits said inner receptacle 10 to enter when pressure is applied to the latter, the casing taking on the general shape of said inner receptacle, and suitable to receive a pair of spectacles. Thus a spectacle case of attractive appearance provides adequate protection for the spectacles by means of said loosely assembled inner receptacle 10. If desired said cloth cover of one said side piece 42 may be continued to provide a closure flap that covers the open end of my case.

What I claim is:

1. A spectacle case comprising an outer casing that is relatively flexible and an inner receptacle in said outer casing that is relatively stiff, said inner receptacle embodying two side portions each having outer flanges at opposite sides thereof, the main body of one said side portion being wider than the main body of the other side portion, and a connecting portion connecting the main bodies of and spacing apart said side portions, said flanges adjacent said wider main body being wider than said flanges adjacent the narrower said main body, said flanges of said two side portions which are at one side of said receptacle being adjacent and parallel to each other and the said flanges at the opposite side thereof being adjacent and parallel to each other, the wider of said flanges being at the outside.

2. A spectacle case comprising an outer casing that is relatively flexible and an inner receptacle in said outer casing that is relatively stiff, said inner receptacle embodying two side portions each having outer flanges at opposite sides thereof, the main body of one said side portion being wider than the main body of the other side portion, and a connecting portion connecting the main bodies of and spacing apart said side portions, the outer edges of said connecting portion extending diagonally outward from the narrower to the wider said main body, said flanges adjacent said wider main body being wider than said flanges adjacent the narrower said main body, said flanges of said two side portions which are at one side of said receptacle being adjacent and parallel to each other and the said flanges at the opposite side thereof being adjacent and parallel to each other, the wider of said flanges being at the outside.

3. A spectacle case comprising an outer casing that is relatively flexible and an inner receptacle within said outer casing that is relatively stiff, said outer casing embodying two flat side pieces having an inner body, a cover at the outside face and a cover at the inside face of said body, said side pieces being attached together at the outer border portions except at one end, said outer casing being adapted to receive said inner receptacle when the latter is inserted therein under pressure, said inner receptacle embodying two side portions each having outer flanges at opposite sides thereof, the main body of one said side portion being wider than the main body of the other said side portion, and a connecting portion connecting the main bodies of and spacing apart said side portions, the outer edges of said connecting portion extending diagonally outward from the narrower to the wider said main body, said flanges adjacent said wider main body being wider than said flanges adjacent the narrower said main body, said flanges of said two side portions which are at one side of said receptacle being adjacent and parallel to each other and the said flanges at the opposite side thereof being adjacent and parallel to each other, the wider of said flanges being at the outside.

References Cited in the file of this patent

UNITED STATES PATENTS

| | | |
|---|---|---|
| 1,530,214 | Stanley | Mar. 17, 1925 |
| 1,625,668 | London | Apr. 19, 1927 |
| 2,355,027 | Manning | Aug. 1, 1944 |
| 2,498,202 | Dingman | Feb. 21, 1950 |